US010805024B2

(12) United States Patent
Hinton et al.

(10) Patent No.: US 10,805,024 B2
(45) Date of Patent: Oct. 13, 2020

(54) REAL-TIME CALCULATOR FOR HIGH PRECISION CHANNEL SIMULATOR EFFECTS

(71) Applicant: L3 Technologies, Inc., New York, NY (US)

(72) Inventors: Ryan W. Hinton, Farmington, UT (US); Anthony D. Smith, Murray, UT (US); L. Andrew Gibson, Riverton, UT (US); David J. Moore, South Jordan, UT (US); William K. McIntire, Sandy, UT (US)

(73) Assignee: L3 TECHNOLOGIES, INC., New York, NY (US)

( * ) Notice: Subject to any disclaimer, the term of this patent is extended or adjusted under 35 U.S.C. 154(b) by 185 days.

(21) Appl. No.: 15/606,997

(22) Filed: May 26, 2017

(65) Prior Publication Data
US 2018/0343073 A1    Nov. 29, 2018

(51) Int. Cl.
*H04B 17/391* (2015.01)
*H04B 17/364* (2015.01)
*H04B 17/00* (2015.01)

(52) U.S. Cl.
CPC ..... *H04B 17/3912* (2015.01); *H04B 17/0087* (2013.01); *H04B 17/364* (2015.01)

(58) Field of Classification Search
CPC .... H04B 17/0085; H04B 17/29; H04B 17/19; H04B 17/0087; H04B 17/3912; H04B 17/364
See application file for complete search history.

(56) References Cited

U.S. PATENT DOCUMENTS

| 8,538,682 B1* | 9/2013 | Vankatraman | .......... G01S 19/27 |
| | | | 701/408 |
| 2009/0116456 A1* | 5/2009 | Nuutinen | ............. H04B 1/7113 |
| | | | 370/335 |

(Continued)

OTHER PUBLICATIONS

Sharif, Bayan S., et al. "A Computationally Efficient Doppler Compensation System for Underwater Acoustic Communications" IEEE Journal of Oceanic Engineering, vol. 25, Issue 1, Jan. 2000, 10 pages.

(Continued)

*Primary Examiner* — Yuwen Pan
*Assistant Examiner* — Fatuma G Sherif
(74) *Attorney, Agent, or Firm* — Workman Nydegger

(57) ABSTRACT

One embodiment illustrated herein includes a system for simulating communications in an environment. The system includes a postulated physical environment model, having modeled terrain and continuous changes over time. A channel parameter calculator is coupled to the postulated physical environment model, and configured to obtain samples from the postulated physical environment model, each sample comprising information about modeled terrain at a given time. The channel parameter calculator is further configured to, from the obtained samples, generate communication channel parameters, over time. A channel simulator is coupled to the channel parameter calculator. The channel simulator is configured to be coupled to signal source and to, using the communication channel parameters, apply the communication channel parameters to a communication signal from the signal source to simulate transmission of data through a simulated channel over time.

20 Claims, 5 Drawing Sheets

(56) References Cited

U.S. PATENT DOCUMENTS

| | | | | |
|---|---|---|---|---|
| 2010/0304686 A1* | 12/2010 | Kennedy | ............... | H04W 24/00 |
| | | | | 455/67.11 |
| 2012/0207198 A1* | 8/2012 | Becker | .................. | H04L 7/0029 |
| | | | | 375/224 |
| 2013/0101068 A1* | 4/2013 | Mombers | .................. | H03L 7/18 |
| | | | | 375/316 |
| 2017/0242129 A1* | 8/2017 | Kallankari | ............ | G01R 29/105 |

OTHER PUBLICATIONS

Wang Xiaohui et al: "Improving the Accuracy of Environment-Specific Channel Modeling", IEEE Transactions on Mobile Computing, IEEE Service Center, Los Alamitos, CA, US, vol. 15, No. 4, Apr. 1, 2016 (Apr. 1, 2016), pp. 868-882, XP011609417, ISSN: 1536-1233 [retrieved on Mar. 3, 2016].

Keysight Technologies: "Demystifying the Impact of ADCs and DACs on Test Intsrument Specifications", Microwave, Dec. 10, 2015 (Dec. 10, 2015), XP055499201, USA Retrieved from the internet: URL:http://literature.cdn.keysight.com/litweb/pdf/5992-1243EN.pdf?id=2676312 [retrieved on Aug. 13, 2018] p. 10.

\* cited by examiner

REAL-TIME CALCULATOR FOR HIGH PRECISION CHANNEL SIMULATOR EFFECTS

BACKGROUND

Background and Relevant Art

In aircraft communication design, there is often a need or desire to test communication hardware with signals in simulated environments. This can be done by connecting an aircraft's communication hardware to simulation hardware that provides simulated radio signals. Current radio channel simulators are used by radio designers to evaluate their products in certain scenarios, with certain impairments (e.g. flat or frequency-selective fading) for evaluating the quality of their product or for meeting required specifications. Typically the radio channel impairments are entered statically or as a set of files that specify the physical scenario or channel parameters directly over time. Such channel parameters may include gain, phase, delay, and/or filter response.

Due to the use of statically defined channel parameters or manually provided channel parameters, there are several challenges. One such challenge is that there may be a limited amount of simulation that can be performed. For example, when all of the statically defined channel parameters have been used, additional simulation using the already used statically defined channel parameters will not yield any new test results. Manually entered channel parameters may be time consuming to generate and enter into the simulation. Statically defined or manually entered channel parameters, when provided to the communication hardware under test may cause abrupt jumps in timing or phase as new channel parameters are provided to the simulation hardware. Additionally or alternatively, a limitation of statically defined channel parameters is that the dynamic response of the system to the variations in the channel cannot be tested. For example, the dynamic response of loops or automatic gain controls (AGCs) within a demodulator cannot be tested by use of a statically defined channel. Additionally, when parameters are entered statically, interactive simulation cannot be performed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a system for simulating communications in an environment. The system includes a postulated physical environment model. The postulated physical environment model includes modeled terrain and continuous changes over time. The system further includes a channel parameter calculator coupled to the postulated physical environment model. The channel parameter calculator is configured to obtain samples from the postulated physical environment model, each sample comprising information about modeled terrain and conditions at a given time. The channel parameter calculator is further configured to, from the obtained samples, generate communication channel parameters, over time, such that communication channel parameters are generated continually, meeting all sample boundary conditions down to multiple derivatives in a continuous manner using the samples from the postulated physical environment. The system further includes a channel simulator coupled to the channel parameter calculator. The channel simulator is configured to be coupled to signal source and to, using the communication channel parameters, apply the communication channel parameters to a communication signal from the signal source to simulate transmission of data through a simulated channel over time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
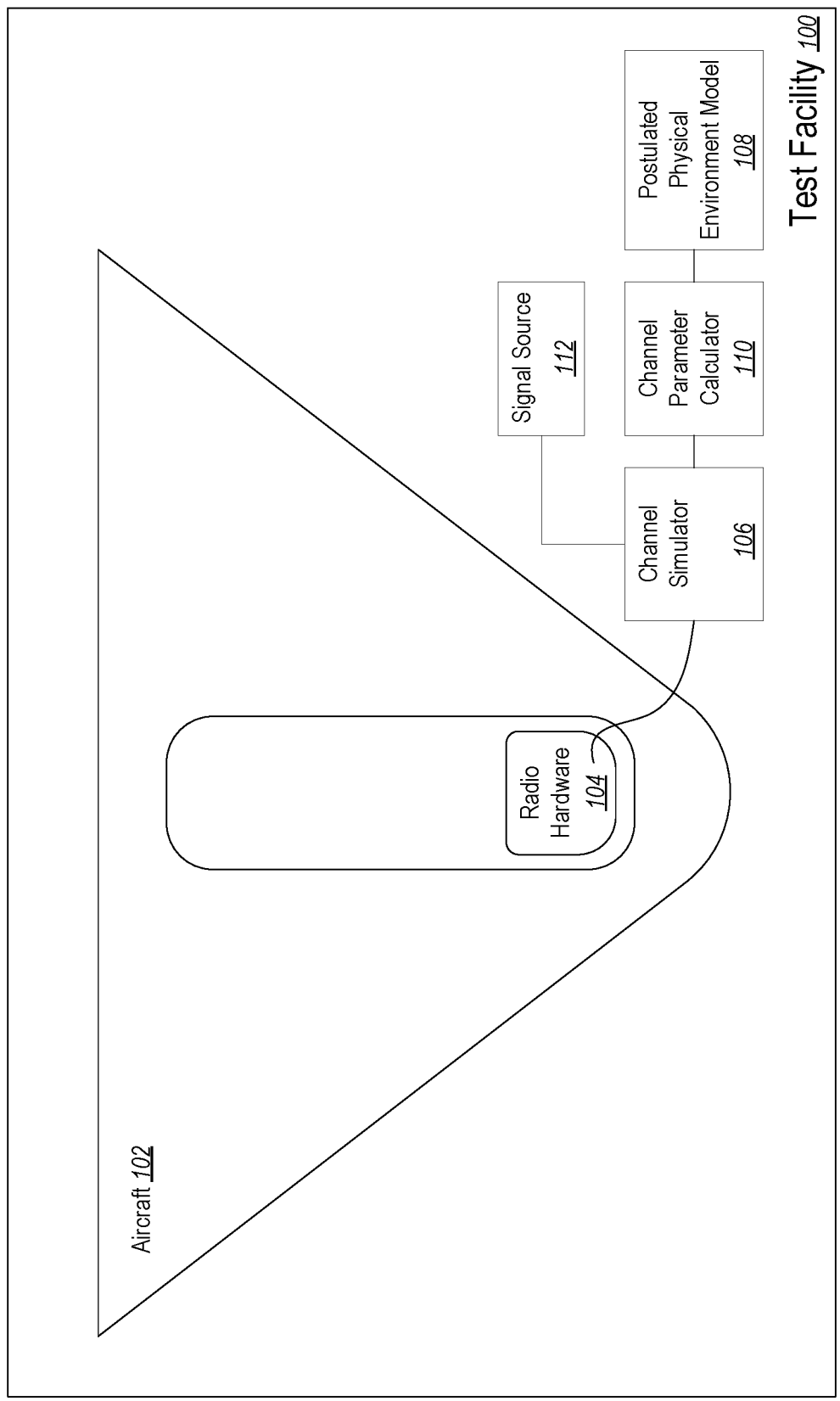
FIG. 1 illustrates a test facility for testing communication hardware.

Embodiments illustrated herein calculate channel parameters for a radio channel simulator from postulated physical information about simulated motion of radio hardware (such as a radio transmitter and/or a receiver); signal attenuation (e.g. from walls, fog, free space path loss (FSPL), etc.); multipath (e.g. reflections from buildings, water or other large surfaces, etc.); and/or other environmental conditions in a postulated physical environment. Thus, embodiments can calculate the channel parameters from postulated physical information in real-time as they are needed. This creates a more efficient system that does not require inputting of real time parameters. Additionally, using various techniques described below, signal irregularities can be avoided by avoiding abrupt changes in the signal.

In particular, embodiments may be used in the context of a postulated physical environment. The postulated physical environment is a model which includes modeled terrain, temperature and weather conditions, and the like. Certain weather conditions are simulated, in some embodiments, by translating fading associated with various conditions to gains. The postulated physical environment continuously changes over time. For example, this may be due to changes in perspective (e.g., changes in location in the postulated physical environment, or changes in which device perspective is being used, such as a change from a transmitter perspective to a receiver perspective), changes in temperature, changes in weather, changes in objects in the postulated physical environment (e.g., simulated aircraft entering or leaving the postulated physical environment), etc. Thus, for time-varying scenarios, the channel parameters are varying because something about the postulated physical environment is changing.

Embodiments use the "original" source information of the postulated physical environment to calculate in real time the channel parameters (although some embodiments may pre-calculate some of the parameters and store the pre-calculated channel parameters in a buffer) provided to the channel simulator instead of requiring the scenario to be set up and stored in a file ahead of time. Also, in some embodiments the postulated physical environment changes may be time-stamped to allow control over when the effects of the postulated physical environment changes are implemented relative to a system-wide clock.

As will be shown below, a channel parameter calculator according to some embodiments of the invention accepts not only delays but also potentially velocity and acceleration of the relative motion between a transmitter and receiver. Using the velocity allows the channel parameter calculator to calculate consistent time and phase effects on the signal instead of specifying them separately (which can be prone to error, inaccuracy, and/or abrupt changes which may introduce artifacts that cause communication errors). Indeed, some previous simulators may (inaccurately) not vary the delay with Doppler at all.

Some embodiments may use higher order derivatives in the parameter calculator which allows for interpolation between provided sample points with excellent accuracy and so that the results will be continuous with no abrupt jumps in timing or phase.

The parameter calculator may be implemented on an application-specific processor so it runs fast enough to track the postulated physical environment even at jet aircraft speeds but requires relatively few hardware resources.

The parameter calculator can be configured to operate on environment updates in real-time. This has several advantages, including one or more of: (1) complex physical scenarios can be modeled in real time without the computational complexity or latency of calculating the effects externally, (2) the scenario duration is not limited by the memory in the channel simulator, and (3) the physical scenario can be generated dynamically and implemented immediately.

The parameter calculator can use the aforementioned sample point time stamps to precisely control when the effects are applied. This allows for guarantees regarding the relative separation between effect sample points even when streaming the updates in real time. Additionally or alternatively, this allows users to schedule effects long in advance if desired. Additionally or alternatively, this allows for scheduling channel simulator effects to synchronize with other events in the larger system.

Note, embodiments may be used in an interactive way. For example some embodiments allow a human user to be in the pilot seat of a flight simulator and simulate real-time performance. For instance, the pilot may see a radio tower, or notice that their communications get scrambled over a particular part of a city, and travel around that area. In other words, some embodiments of the invention allow an interactive simulator instead of requiring the parameters to be entered ahead of time.

Referring now to FIG. 1, an example is illustrated. FIG. 1 illustrates a test facility 100. The test facility may be a warehouse, airplane hangar, tarmac, or other physical environment where radio equipment can be physically housed.

FIG. 1, in the illustrated example illustrates an aircraft 102. The aircraft 102 may be a jet propelled airplane, internal combustion engine powered airplane, glider, helicopter, or other aircraft. Additionally, it should be appreciated that other vehicles or mobile apparatuses may be used. Further, in some embodiments, a physical vehicle may not be needed if radio hardware to be tested is able to be powered and tested without the vehicle into which it will be eventually deployed.

FIG. 1 illustrates radio hardware 104 to be tested. For example, the radio hardware 104 may include a communication transmitter and/or communication receiver. The radio hardware 104 may be for audio and/or data transmission and/or reception. Often, the radio hardware 104 may be configured to modulate data using a carrier signal that is at some static or variable frequency that is significantly greater (indeed in some embodiments, several orders of magnitude greater) than the audio and/or data signal bandwidth. Alternatively or additionally, the signal bandwidth may be quite large for transmitted audio or data and may comprise multiple narrow-band, disparately placed signals FIG. 1 further illustrates a channel simulator 106 coupled to the radio hardware 104. The channel simulator 106 produces, as output (using radio signals from the signal source 112 as input, as well as channel parameters from the channel parameter calculator 110 to modify the input signals), radio signals that appear similar or nearly identical to the radio signals that the radio hardware 104 would receive in a working environment. For example, the channel simulator 106 may produce radio signals that would ordinarily be received by the radio hardware 104 as the aircraft 102 in which the radio hardware is deployed moves around in a real world environment, such as an environment including a flight path of the aircraft 102.

Note that, in real world environments, such radio signals will have several factors that affect the characteristics of the signals that need to be simulated by the channel simulator 106. For example, in the first instance, the signals have characteristics created by a signal generator. The base audio or data signal will have an effect on the characteristics of the radio signals. Additionally, signal processing including: filtering, amplification, and modulation of the base audio or data signal will have an effect on the characteristics of the radio signals.

Transmission hardware used to transmit from the signal generator to a receiver in the radio hardware 104 will have an effect on the radio signal characteristics.

Once transmitted, environmental factors will have an effect on the radio signal characteristics. For example, the characteristics of the medium (typically through air, water, or some combination thereof for humid environments) will have an effect on the radio signal characteristics. For example, humidity of air, air pressure, temperature, salinity of water, or other medium characteristics can affect the speed at which signals travel through the medium. This can result in delays of the radio signal. Additionally, objects in the environment can affect the radio signal characteristics. For example, objects may block portions of the radio signal, reflect portions of the radio signal, and/or refract portions of the radio signal. Reflection and refraction can result in parts of the radio signal traveling along different paths from a transmitter to a receiver. Thus, different parts of the radio signal may reach a receiver at different times. This is commonly referred to as multi-path transmission.

Thus, a postulated physical environment model 108 will model weather (including temperature, pressure, cloud cover, humidity, etc.), landscape (including such things as bodies of water, hills and mountains, buildings, large paved surfaces, other moving vehicles), etc.

Movement of the radio hardware (e.g., as a result of the aircraft moving) will also affect the radio signal in real world scenarios. In particular, the Doppler effect may cause frequency shifts in the radio signal.

Note that all or many of the real world factors discussed above may affect the signal in a frequency dependent way. That is, different frequencies will be affected differently by the same real world factor. For example, the aircraft traveling at a particular speed will cause a different frequency shift for different frequencies in the radio signal. Note that because the radio signal is typically composed of multiple frequencies, different portions of the signal will be affected differently by external real world factors. Thus, it can be incredibly difficult to attempt to create a radio signal by computation alone as there an enormously large number of variables that may need to be taken into account for such a computation. In contrast, embodiments illustrated herein may use postulated physical environment sampling of the postulated physical environment model 108, over time, to generate a model radio signal at the channel simulator 106 that can be provided to the radio hardware 104.

Note that the postulated physical environment model 108 may be variant in at least location and time. That is, the model can be observed at different postulated locations, such as different Cartesian coordinates, and at different times. The different times are represented by a delay. For example, in some embodiments, a time stamp may be used to specify a particular delay from a reference point. Alternatively or additionally, a particular absolute time may be used.

A channel parameter calculator 110 can calculate certain channel parameters based on the postulated physical environment model 108 using time (e.g., delay) and location as inputs into the channel parameter calculator 110. Ordinarily, the channel parameters will include absolute (or changes in) amplitude, frequency variation, multipath, and delay. Additionally, the postulated physical environment model 108 may be sampled over time at a predetermined rate. However, if samples are needed for a delay between samples, interpolation can be performed, as illustrated below, to obtain a smooth sample signal not having abrupt changes in distance, acceleration, and velocity. This interpolation can be used to estimate changes in the postulated physical environment model 108 from the perspective of the radio hardware, as well as distance, velocity, acceleration and/or other movement of the radio hardware. Note that in some embodiments, it is the input distance and velocity (sampled at a low rate) that enable estimation of acceleration (also at a low rate). Then, in some embodiments, the distance, velocity, and acceleration samples (all sampled at a low rate) enable the estimation of interpolated values of the same along with all other time-varying aspects of the simulated signal, from the perspective of the receiver in the radio hardware 104.

The channel simulator 106 uses the parameters provided by the channel parameter calculator 110 to generate a simulated signal that is provided to the radio hardware 104. This can be used to evaluate the response of the radio hardware 104 as if the aircraft 102 were moving about a physical environment such as a physical environment modeled by the postulated physical environment model 108.

Additional details are now illustrated. Embodiments can perform a real-time, online simulation effects calculation and from that calculation, generate a simulated signal for a channel. Generally, the effects of most interest include time-varying delay, Doppler shift, and Doppler rate. Note that Doppler can apply to any combination of time-varying aspects of the signal.

For example, all center frequencies (consider multiple signals at various center frequencies) in a bandwidth of interest (e.g., 200 MHz) are shifted correctly. As noted previously, traditional methods to apply a Doppler shift, apply a single shift to the entire, composite signal, where the shift is determined as $f_{shift}=f_c*(v/c)$, and where c is the speed of waves in the environmental medium (e.g., the speed of light in air) and v is the relative velocity between a device emitting a signal and a device receiving the signal. However, because $f_{shift}$ is a function of $f_c$, it is correct for only one frequency within the composite signal. Signals transmitted within the composite signal at different values of $f_c$, would be shifted by incorrect amounts. As one composite signal may contain several independent signals—all with different values for $f_c$—it is not possible, or at least very difficult and computationally rigorous, to shift all frequencies correctly by applying the traditional method of shifting the composite signal.

Other examples of Doppler effects that are applied correctly by embodiments illustrated herein are symbol rate and (in general) bandwidth expansion. Also, all effects are designed to be continuously (or continually) varying, as opposed to being static as is the case with other channel emulators.

Note that in the examples illustrated below some embodiments may be practiced where the radio hardware 104 acts as a transmitter in place of the signal source 112 and a test receiver (not shown) may be implemented to test the transmitting functionality of the radio hardware 104 as a simulation is performed with the postulated physical environment model 108.

Figure 2:
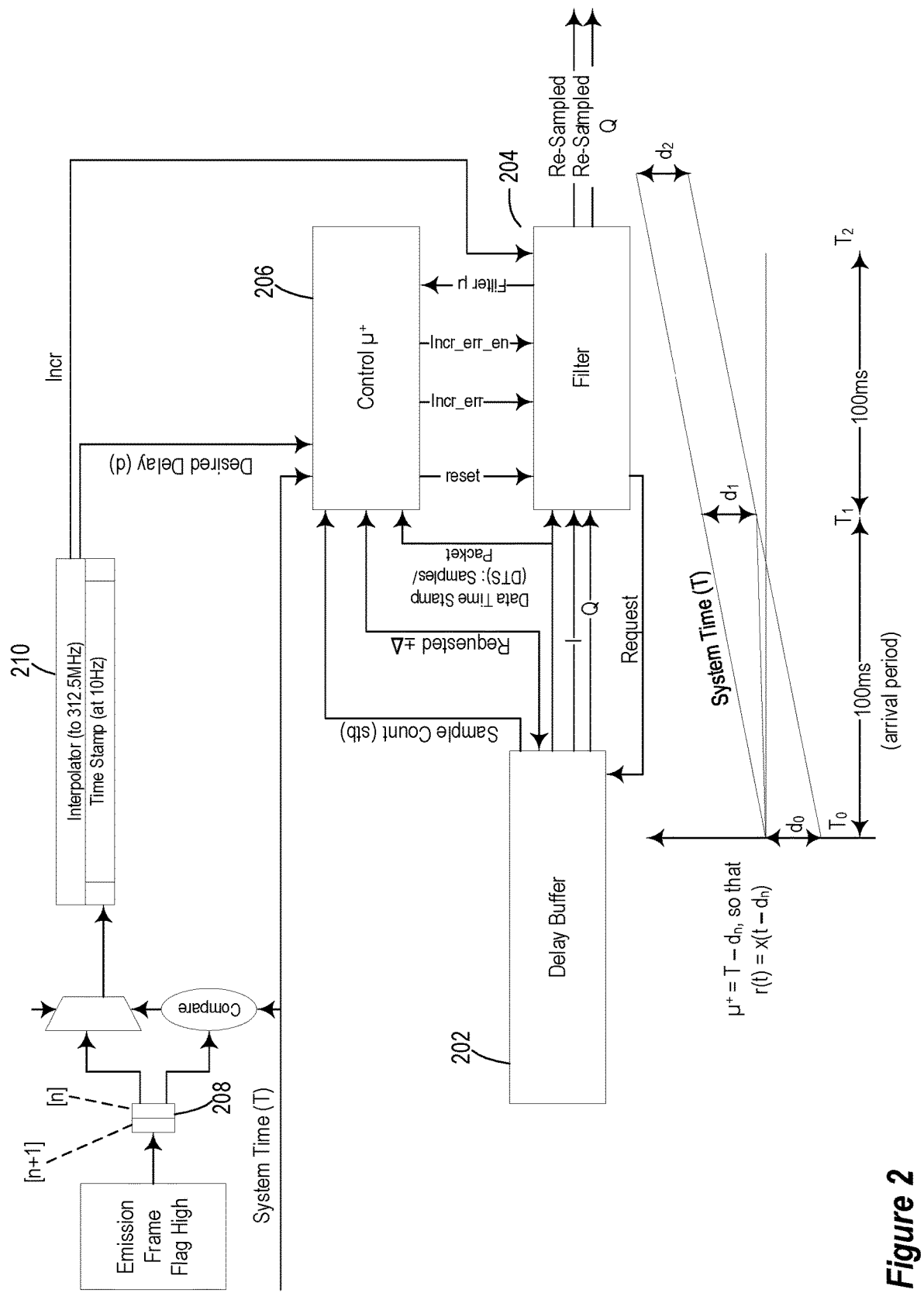
FIG. 2 illustrates a timing control circuit.

Referring now to FIG. 2, an example of where simulation effects are used is illustrated. FIG. 2 illustrates a simulation effects queue 208. This simulation effects queue 208 receives and stores channel parameters from the postulated physical environment model 108 illustrated in FIG. 2. As illustrated in FIG. 2, the simulation effects queue 208 stores environment parameters until such time as a system time matches (or is a least near) an environment parameter time stamp.

FIG. 2 further illustrates an interpolator 210. Portions of the channel parameter calculator 110 illustrated in FIG. 1 are represented by the simulation effects queue 208 and the interpolator 210. The interpolator 210 may be, for example a Hermite or Newtonian interpolator configured to interpolate between sample points from the effects queue 208. For example, the Hermite interpolation may interpolate between samples taken at time 1 and time 2. The Hermite interpolation will interpolate between the delays $d_1$ and $d_2$, the velocities $v_1$ and $v_2$, the accelerations $a_1$ and $a_2$, and/or propagation losses (i.e., attenuations).

In particular, during a simulation, as simulated terrain changes, platform movement (e.g., the aircraft 102 or the radio hardware 104) is simulated, or movement of the signal source 112 with respect to the platform is simulated, the relative delay, velocity, acceleration, and/or propagation loss varies over time. The postulated physical environment model 108 is the source for these characteristics. When appropriate, the postulated physical environment model 108 provides these characteristics to the calculator 110 (e.g., the effects queue 208 and subsequently to the interpolator 210). The effects queue 208 receives these updated characteristics slightly ahead of time and holds them until the desired time. Alternatively, the effects may appear slightly delayed in real time. For example, a delay of a few tenths of a second may be experienced. In yet another alternative embodiment, the queue 208 may be bypassed such that the interpolator receives real-time effects as soon as they are available.

FIG. 2 further illustrates a (large) buffer 202 for holding samples of a simulated signal from a signal source 112 (see FIG. 1), a filter 204, and a delay controller 206. Note that the signal source 112 could be one or more signal generators, one or more radio transmitters, etc.

The filter 204 interpolates between the samples of the data signal to be transmitted. It provides both resampling and fine delay control. For example, a typical signal from the signal source 112 to be transmitted may have been originally sampled at 10 MHz. The digital-to-analog converter (DAC) sampling the signal source 112 in a system may run, for example, at a nominal 312.5 MHz. In this case, embodiments could set a filter increment control (not shown) to produce 31.25 output samples per input sample. To move forward or backward a fraction of a sample, embodiments can adjust the increment error control ("Incr_err") up or down for a short time. The filter 204 also reports the current fractional sample position, called µ ("mu").

An "Incr" signal comes from the interpolator 210 into the filter 204 and contains a calculated Doppler effect on the delay change (first derivative). The interpolator 210 also calculates the current desired delay (zero derivative). The delay controller 206 (labeled "Control µ*") speeds up or slows down the fractional delay filter 204 as necessary through the "Incr_err" signal—in addition to the calculated Doppler sample rate offset "Incr"—to move the current delay toward the desired delay. Once the actual delay matches the desired delay, "Incr_err" should be essentially zero since "Incr" should express how the desired delay is moving over time.

One should not confuse the data signal interpolation provided by the signal filter 204 with the Hermite (or other) interpolation used by the interpolator 210. The former produces samples of the data signal to send down stream such as to a receiver (e.g., the radio hardware 104 illustrated in FIG. 1). The latter directs the rest of the signal processing engine on how to behave during a simulation to process signals from the former. Thus, for example, the effects queue 208 and the interpolator 210 may represent at least portions of the channel parameter calculator 110 illustrated in FIG. 1, while the delay buffer 202, filter 204 and delay controller 206 represent possible portions of the channel simulator 106 illustrated in FIG. 1.

The delay buffer 202 is a buffer for storing signal samples. In some embodiments, the filter 204 may be configured to request a new sample from the buffer 202. When the filter 204 requests a new sample from the buffer 202, the buffer 202 provides the next sample from some set of queued up samples. In some such embodiments, the delay buffer 202 stores the bulk of its samples to off-chip RAM.

In some alternative embodiments, the buffer 202 is configured to produce samples automatically at a desired rate. Embodiments may be implemented where this rate is a variable rate.

The delay controller 206 implements a feedback loop to drive the actual delay toward a desired delay. The interpolator 210 provides the current desired delay. The delay controller 206 counts the number of samples (such as by using strobe) sent from the buffer 202 to the filter 204. The delay controller 206 also has access to the filter fractional sample position. The delay controller 206 combines these to get the current fractional sample position.

Further, some samples occur exactly at some system time and are marked as such. For example, the samples may be associated with a system time stamp. Using these time stamps, the current fractional sample position, and a sample rate (which may be a pre-calculated sample rate), the delay controller 206 calculates the current data time. The delay controller 206 may use an available system time value to calculate the actual data delay, and compare it against the desired data delay. Then the delay controller 206 drives the filter increment error to move the actual data delay toward the desired data delay.

The following illustrates a computation for calculating the sampling interval (period) for the overall interpolation process:

$$t_s' = \frac{(c_\epsilon + v)}{c_\epsilon} t_s$$

where v is the relative velocity between transmitting and receiving platforms;

$c_\epsilon$ is the speed of light in a given medium, which may be different for different transmission mediums;

$t_s$ is the pre-channel-effects sampling interval, and $t_s'$ is the final sampling interval, or the sampling interval that implements both the time aspects of the channel-effects and the input- to output-sampling rate change.

The pre-channel-effect sampling interval $t_s$ can be expressed simply as $$t_s = \frac{t_{s\_in}}{N_{up}}$$

where $t_{s\_in}$ is an input sampling period, and $N_{up}$ is an up-sampling amount. Note: if $N_{up}>1$, up-sampling occurs. If $N_{up}<1$, down-sampling occurs.

For example, assume a channel-effects block (e.g., the channel simulator 106 in FIG. 1, and/or the delay buffer 202 and filter 204 in FIG. 2) receives data signal samples from a data signal (e.g., a data signal produced by the signal source 112) that is sampled at 10 kHz (i.e., $f_{s\_in}=10$ kHz), and the DAC (not shown, but providing input to the delay buffer 202) samples at 312.5 MHz. Then, the output rate from the DAC is 312.5 MHz. In this case, $t_{s\_in}=1/f_{s\_in}$, and Nup is 312.5e6/10e3=3.125e3, such that $t_s=3.2e-9s$ (3.2 ns).

The interpolator 210 receives environment samples from the postulated physical environment model 108 and provides the desired delay and an adjustment to the filter increment Incr, consumed by the filter 204, according to the current platform simulated velocity. The delay controller 206 provides an error term, Incr_err, for the filter increment that drives the delay error to zero. Ideally, once the delay controller 206 has driven the actual delay to match the desired delay, the increment adjustment should keep the actual delay matched up with the desired delay. In other words, the filter increment adjustment is the derivative of the desired delay. Due to finite time steps and quantization, in some embodiments, the delay controller runs all of the time and cleans up any small discrepancies.

Figure 3:
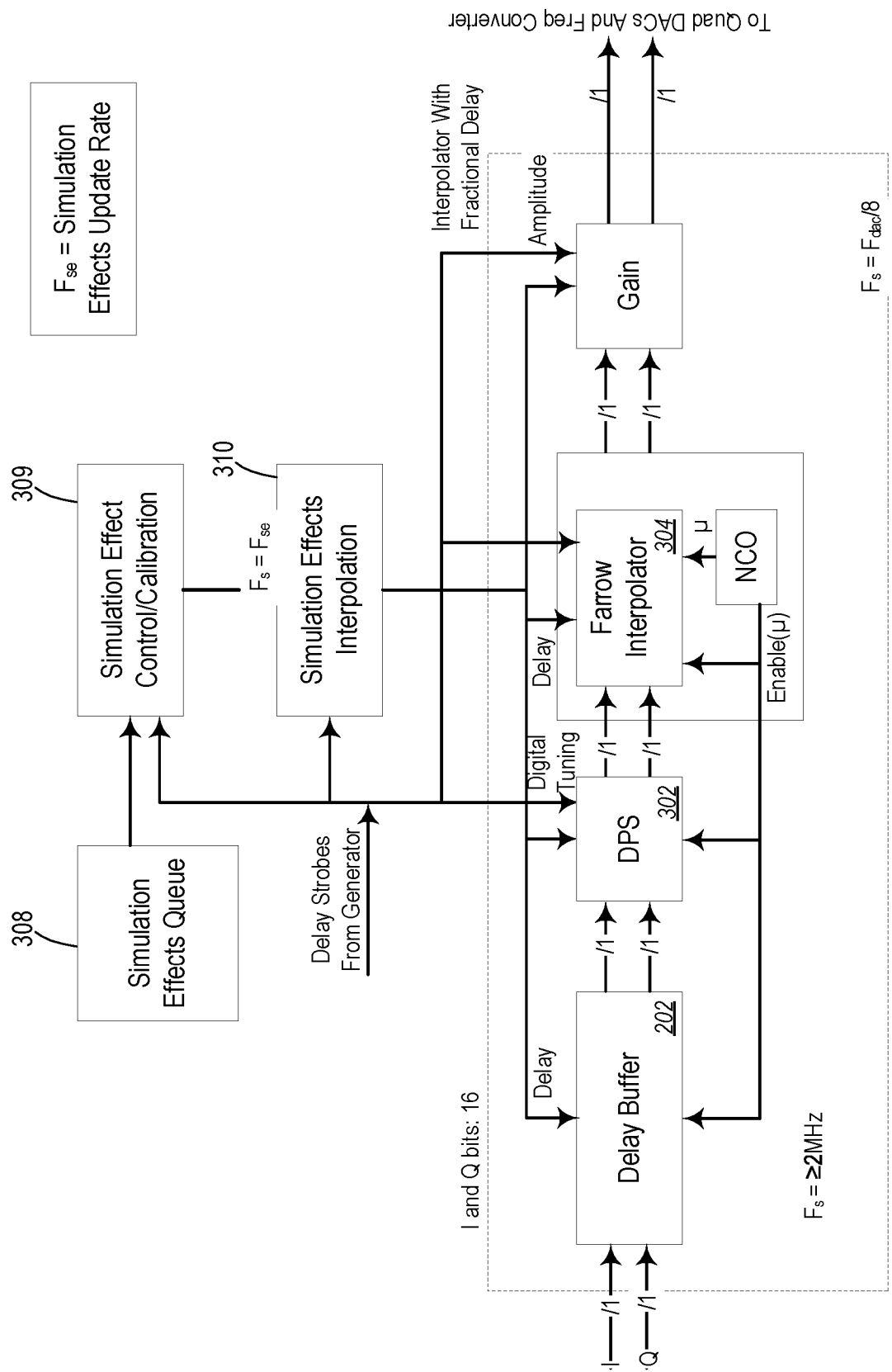
FIG. 3 illustrates a simulation effects block.

The following illustrates details with respect to an alternative embodiment. In particular, FIG. 3 illustrates a simulation effects queue 308, which is similar in function to the simulation effects queue 208 shown in FIG. 2. FIG. 3 further illustrates a simulation effect control/calibration module 309 and a simulation effects interpolation module, which together provide similar functionality to the interpolator 210 and the channel parameter calculator 110. Note that some embodiments implement the simulation effect calculator 310 using an application-specific processor. In particular, the application-specific processor includes application-specific floating-point multiply and add units.

The application-specific processor executes instructions to receive the current sampled simulation parameters, sampled from a postulated physical environment model (e.g., postulated physical environment model 108), like distance, velocity, and acceleration that are provided at a low rate (e.g., 10 updates per second), and interpolate up to a much faster rate, close to 1 MHz. The application-specific processor executes instruction to perform, in some embodiments, a Hermite interpolation. The Hermite interpolation may interpolate, for example, between sample points. For example, the Hermite interpolation may interpolate between samples taken at time 1 and time 2. The Hermite interpolation will interpolate between the delays $d_1$ and $d_2$, the velocities $v_1$ and $v_2$, and the accelerations $a_1$ and $a_2$.

Other embodiments may perform other interpolations, such as a Newton interpolation. For example, some embodiments may interpolate the distance using the following quadratic physics interpolation $$d[tn]=d_0+v[m]tn+(1/2)*a[m]tn^2$$

where d[tn] is the position at time tn=nTs; Ts is the sample period; and n is the number of samples within the mth interval. Therefore, m counts the number of input sampling intervals and n counts the number of output (or up-sampled) sampling intervals. The distance $d_0$ is the initial position, v[m] is the mth sample of velocity, and a[m] is the mth sample of acceleration. Both v[m] and a[m] are constant during the mth interval. Velocity is also interpolated within the mth interval using the appropriate equation such as $$v[tn]=v_0+a[m]*tn,$$

where a[m] is again the mth sample of acceleration and is assumed constant for the mth interval. This method is continuous to the second derivative of distance. For continuity to the third derivative, jerk (the derivative of acceleration), is estimated and applied to estimate distance, velocity, and acceleration. In this case, jerk (or j[m]) is assumed constant over the mth interval. In such a scenario, the delay, d[tn], is calculated as follows:

$$d[tn]=d_0+v[m]tn+(1/2)*a[m]tn^2+(1/6)*j[m]tn^3$$

The interpolation also compensates for timing jitter and missing samples in the incoming data stream, unit conversions, etc. The interpolated, unit-converted, results include the desired delay and filter increment adjustment as well as an increment value for a carrier frequency mixer 303, that receives signal samples from the delay buffer 302 that is similar to the delay buffer 202. Note that in some embodiments, the carrier frequency mixer 303 is implemented after the delay buffer 302 and filter 304 illustrated in FIG. 3. Note that while a Farrow Interpolator is illustrated here for the filter 304, it should be appreciated that in other embodiments, other types of re-sampling filters may be used.

Figure 4:
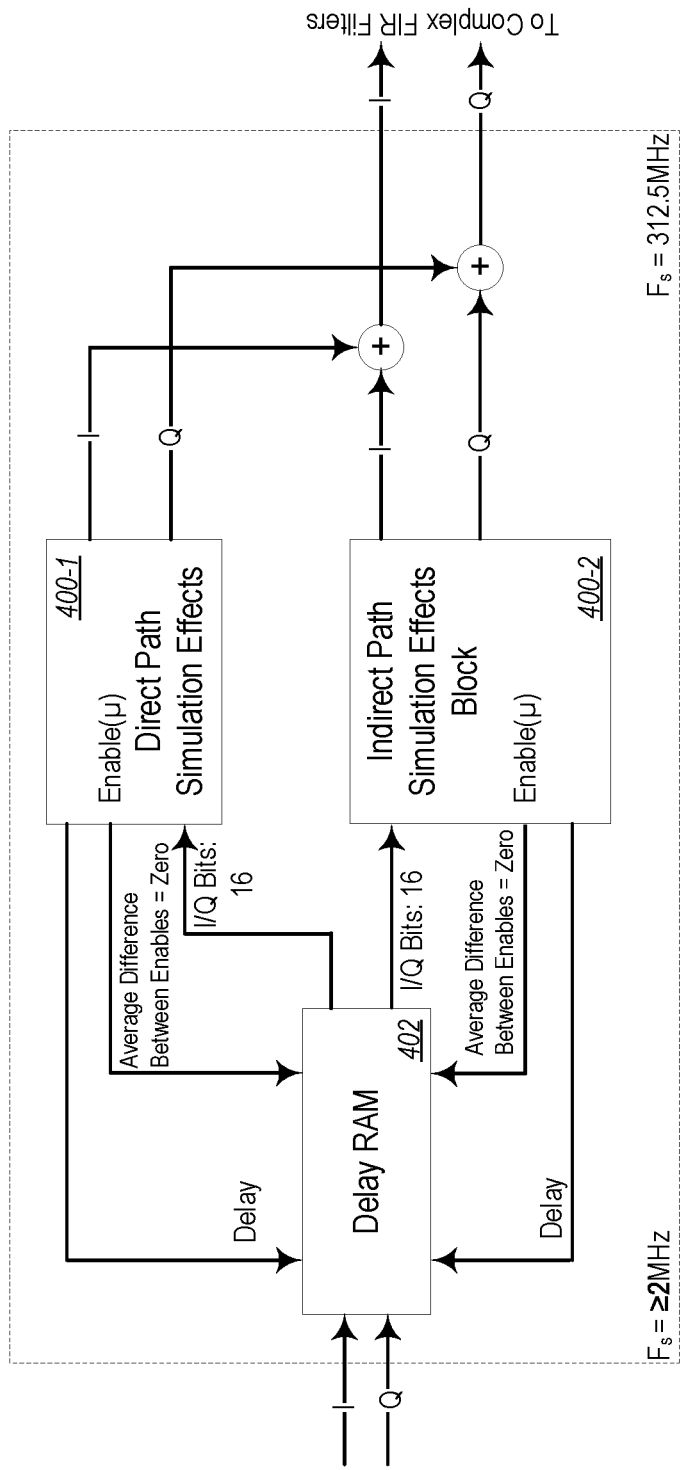
FIG. 4 illustrates simulation effects blocks for multipath simulation.

Embodiments can achieve multipath effects by splitting the signal and applying this independently on two or more different branches. An example of this is illustrated in FIG. 4. FIG. 4 illustrates a delay buffer 402, which is similar to the delay buffer 302 shown in FIG. 3. Namely, the delay buffer 402 is a bulk buffer which stores samples taken from the signal source (e.g. signal generator or real/actual radio). The samples from the delay buffer 402 are then provided to different simulation effects blocks 400-1 (a direct path simulation effects block) and 400-2 (an indirect path simulation effects block). Note that while a single indirect path simulation effects block 400-2 is illustrated, it should be appreciated that multiple indirect simulation effects blocks can be used to represent the various multipath that a signal may take in an environment.

The simulation effects blocks 400-1 and 400-2 include fine grained buffers that output data at different rates to simulate direct path and multipath signal travel in an environment.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
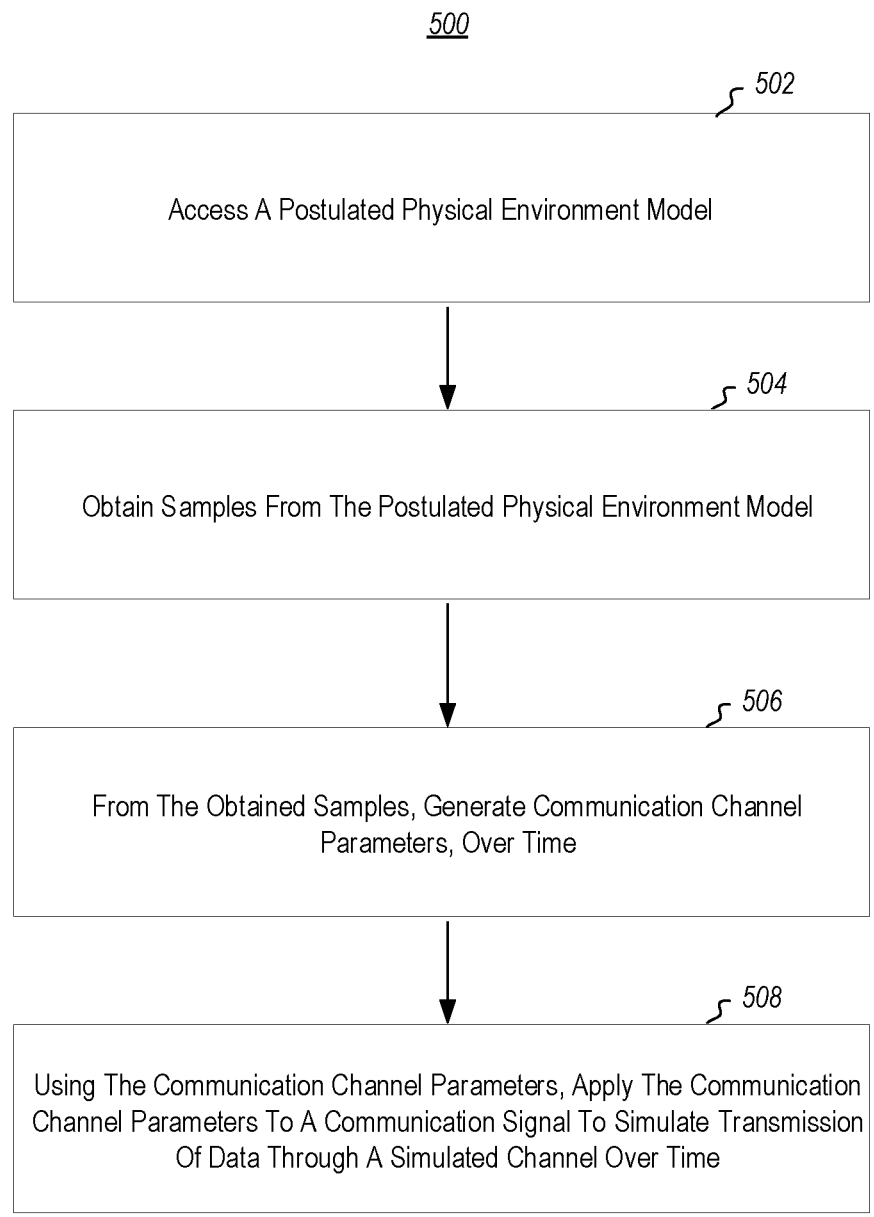
FIG. 5 illustrates a method of simulating communications in a communication channel.

Referring now to FIG. 5, a method 500 is illustrated. The method 500 includes acts for simulating communications in a communications channel. The method includes accessing a postulated physical environment model (act 502). The postulated physical environment model includes modeled terrain, continuous changes over time, and optionally weather conditions. For example, the channel parameter calculator 110 may access the postulated physical environment model 108.

The method 500 further includes obtaining samples from the postulated physical environment model (act 504). Each sample includes information about modeled terrain and optionally weather conditions at a given time. For example, the channel parameter calculator 110 may obtain samples from the postulated physical environment model 108.

The method 500 further includes, from the obtained samples, generating communication channel parameters, over time (act 506). Communication channel parameters are generated over time using the samples from the postulated physical environment. For example, the channel parameter calculator 110 may generate communication channel parameters, such as delay, velocity, acceleration, etc.

The method 500 may further include, using the communication channel parameters, applying the communication channel parameters to a communication signal to simulate transmission of data through a simulated channel over time (act 508). For example, the channel simulator 106 may receive communications from the signal source 112 and use the channel parameters to simulate a channel through which the communications to radio hardware 104 are received. Alternatively, the channel simulator 106 may obtain communications from the radio hardware 104 and use the channel parameters to simulate a channel through which the communications from the radio hardware are received.

The method 500 may further include interpolating between environment samples obtained in act 504 to calculate interpolated samples. In such embodiments, generating communication channel parameters is performed using interpolated samples. For example, interpolating between obtained samples may include performing a Hermite interpolation as described above. Alternatively or additionally, interpolating between obtained samples may include performing a Newton interpolation.

The method 500 may further include sampling a communication signal by interpolating a native digital to analog converter (DAC) sample rate to a system sample rate. An example of this is illustrated above where a system sample rate is 10 KHz and the DAC sample rate is 312.5 MHz. Sample interpolation can be performed to ensure that appropriate communication signal samples are collected.

The method 500 may be practiced where obtaining samples from the postulated physical environment model comprises interpolating a sample rate using an interpolation that takes into account at least one of a speed of waves in the postulated physical environment model, a simulated velocity between a transmitter and a receiver simulated in the postulated physical environment model or a relative distance simulated in the postulated physical environment between a transmitter and a receiver. For example, as illustrated above, the computation of the sample rate $t_s'$ is performed using speed of wave (which may be variable) and simulated velocity.

The method 500 may be practiced where generating communication channel parameters, over time comprises generating communication channel parameters for a plurality of signal paths. For example, as illustrated in FIG. 4, multipath channel simulation can be performed.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A system comprising:
a postulated physical environment model, wherein the postulated physical environment model comprises modeled terrain, and continuous changes over time;
a channel parameter calculator coupled to the postulated physical environment model and configured to:

obtain samples from the postulated physical environment model, each sample comprising information about objects in the postulated physical environment at a given time, the information about objects in the postulated physical environment comprising information about delay, velocity, and acceleration for the objects in the postulated physical environment;

from the obtained samples, generate communication channel parameters, over time, such that communication channel parameters are generated over time using the samples from the postulated physical environment; and interpolate between obtained samples to obtain interpolated samples, including interpolating delay, velocity, and acceleration between samples for the objects in the postulated physical environment, such that generating communication channel parameters is performed using interpolated samples for the objects, including interpolations of delay, velocity, and acceleration for the objects; and a channel simulator coupled to the channel parameter calculator, wherein the channel simulator is configured to be coupled to a signal source and to, using the communication channel parameters, including channel parameters generated from interpolation between obtained samples, apply the communication channel parameters to a communication signal from the signal source to simulate transmission of data through a simulated channel over time.

2. The system of claim 1, wherein the channel parameter calculator is configured to interpolate between obtained samples by performing a Hermite interpolation.

3. The system of claim 1, wherein the channel parameter calculator is configured to interpolate between obtained samples by performing a Newton interpolation.

4. The system of claim 1, wherein the channel simulator is configured to obtain samples from the radio hardware by interpolating an analog to digital converter (ADC) sample rate to a system sample rate.

5. The system of claim 1, wherein the channel parameter calculator is configured to obtain the samples from the postulated physical environment model by interpolating a sample rate using an interpolation that takes into account at least one of a speed of waves in the postulated physical environment model, a simulated velocity between a transmitter and a receiver simulated in the postulated physical environment model, or a relative distance simulated in the postulated physical environment between a transmitter and a receiver.

6. The system of claim 1, wherein the continuous changes over time comprise changes in weather.

7. A computing system comprising:
one or more processors; and
one or more computer-readable media having stored thereon instructions that are executable by the one or more processors to configure the computer system to simulate communications in a communication channel, including instructions that are executable to configure the computer system to perform at least the following:
accessing a postulated physical environment model, wherein the postulated physical environment model comprises modeled terrain and continuous changes over time;
obtaining samples from the postulated physical environment model, each sample comprising information about objects in the postulated physical environment at a given time, the information about objects in the postulated physical environment comprising information about delay, velocity, and acceleration for the objects in the postulated physical environment;

from the obtained samples, generating communication channel parameters, over time, wherein communication channel parameters are generated over time using the samples from the postulated physical environment;

interpolate between obtained samples to obtain interpolated samples, including interpolating delay, velocity, and acceleration between samples for the objects in the postulated physical environment, such that generating communication channel parameters is performed using interpolated samples for the objects, including interpolations of delay, velocity, and acceleration for the objects; and using the communication channel parameters, including channel parameters generated from interpolation between obtained samples, applying the communication channel parameters to a communication signal to simulate transmission of data through a simulated channel over time.

8. The computer system of claim 7, wherein interpolating between obtained samples comprises performing a Hermite interpolation.

9. The computer system of claim 7, wherein interpolating between obtained samples comprises performing a Newton interpolation.

10. The computer system of claim 7, wherein one or more computer-readable media further have stored thereon instructions that are executable by the one or more processors to configure the computer system to sample the communication signal by interpolating a native digital to analog converter (DAC) sample rate to a system sample rate.

11. The computer system of claim 7, wherein obtaining the samples from the postulated physical environment model comprises interpolating a sample rate using an interpolation that takes into account at least one of a speed of waves in the postulated physical environment model, a simulated velocity between a transmitter and a receiver simulated in the postulated physical environment model, or a relative distance simulated in the postulated physical environment model between a transmitter and a receiver.

12. The computer system of claim 7, wherein generating communication channel parameters, over time comprises generating communication channel parameters for a plurality of signal paths.

13. The system of claim 7, wherein the continuous changes over time comprise changes in weather.

14. A method of simulating communications in a communications channel, the method comprising:
accessing a postulated physical environment model, wherein the postulated physical environment model comprises modeled terrain, and continuous changes over time;
obtaining samples from the postulated physical environment model, each sample comprising information about objects in the postulated physical environment at a given time, the information about objects in the postulated physical environment comprising information about delay, velocity, and acceleration for the objects in the postulated physical environment;
from the obtained samples, generating communication channel parameters, over time, wherein communication channel parameters are generated over time using the samples from the postulated physical environment;

interpolating between obtained samples to obtain interpolated samples, including interpolating delay, velocity, and acceleration between samples for the objects in the postulated physical environment, such that generating communication channel parameters is performed using interpolated samples for the objects, including interpolations of delay, velocity, and acceleration for the objects; and using the communication channel parameters, including channel parameters generated from interpolation between obtained samples, applying the communication channel parameters to a communication signal to simulate transmission of data through a simulated channel over time.

15. The method of claim 14, wherein interpolating between obtained samples comprises performing a Hermite interpolation.

16. The method of claim 14, wherein interpolating between obtained samples comprises performing a Newton interpolation.

17. The method of claim 14, further comprising sampling the communication signal by interpolating a native digital to analog converter (DAC) sample rate to a system sample rate.

18. The method of claim 14, wherein obtaining the samples from the postulated physical environment model comprises interpolating a sample rate using an interpolation that takes into account at least one of a speed of waves in the postulated physical environment model, a simulated velocity between a transmitter and a receiver simulated in the postulated physical environment model, or a relative distance simulated in the postulated physical environment between a transmitter and a receiver.

19. The method of claim 14, wherein generating communication channel parameters, over time comprises generating communication channel parameters for a plurality of signal paths.

20. The method of claim 14, wherein the continuous changes over time comprise changes in weather.

* * * * *